United States Patent [19]

Johnston

[11] Patent Number: 4,694,921
[45] Date of Patent: Sep. 22, 1987

[54] SHEAR BEAM WEIGH AXLE TRANSDUCER

[75] Inventor: Bruce L. Johnston, Jefferson County, Wis.

[73] Assignee: Butler Manufacturing Company, Kansas City, Mo.

[21] Appl. No.: 920,966

[22] Filed: Oct. 20, 1986

[51] Int. Cl.⁴ .................... G01G 19/08; G01G 3/14; G01L 1/22
[52] U.S. Cl. .................... 177/136; 177/211; 73/862.66
[58] Field of Search .................... 177/136, 211; 73/862.66

[56] References Cited

U.S. PATENT DOCUMENTS

| | | | |
|---|---|---|---|
| 3,754,610 | 8/1973 | Paelian et al. | 177/211 |
| 4,095,660 | 6/1978 | Johansson | 177/136 |
| 4,364,279 | 12/1982 | Stern et al. | 73/862.66 |
| 4,459,863 | 7/1984 | Nordstrom | 177/211 X |
| 4,478,091 | 10/1984 | Forrester | 177/136 X |

Primary Examiner—George H. Miller, Jr.
Attorney, Agent, or Firm—Kokjer, Kircher, Bradley, Wharton, Bowman & Johnson

[57] ABSTRACT

A weigh axle transducer for a grain cart or other application in which side loads are applied. A spindle which mounts the cart on a wheel is provided with opposing side openings which form an I-shaped section of the spindle. Strain gauges are mounted on opposite sides of the web of the I section and are wired in a bridge circuit providing an output signal proportional to the shear strain on the web. Each opening has an undercut configuration which enhances the output signal due to the large diameter undercut area and which provides adequate strength against lateral loads due to the smaller diameter portion. Apertures through the web provide wiring passages and act as stress risers to enhance the signal.

12 Claims, 4 Drawing Figures

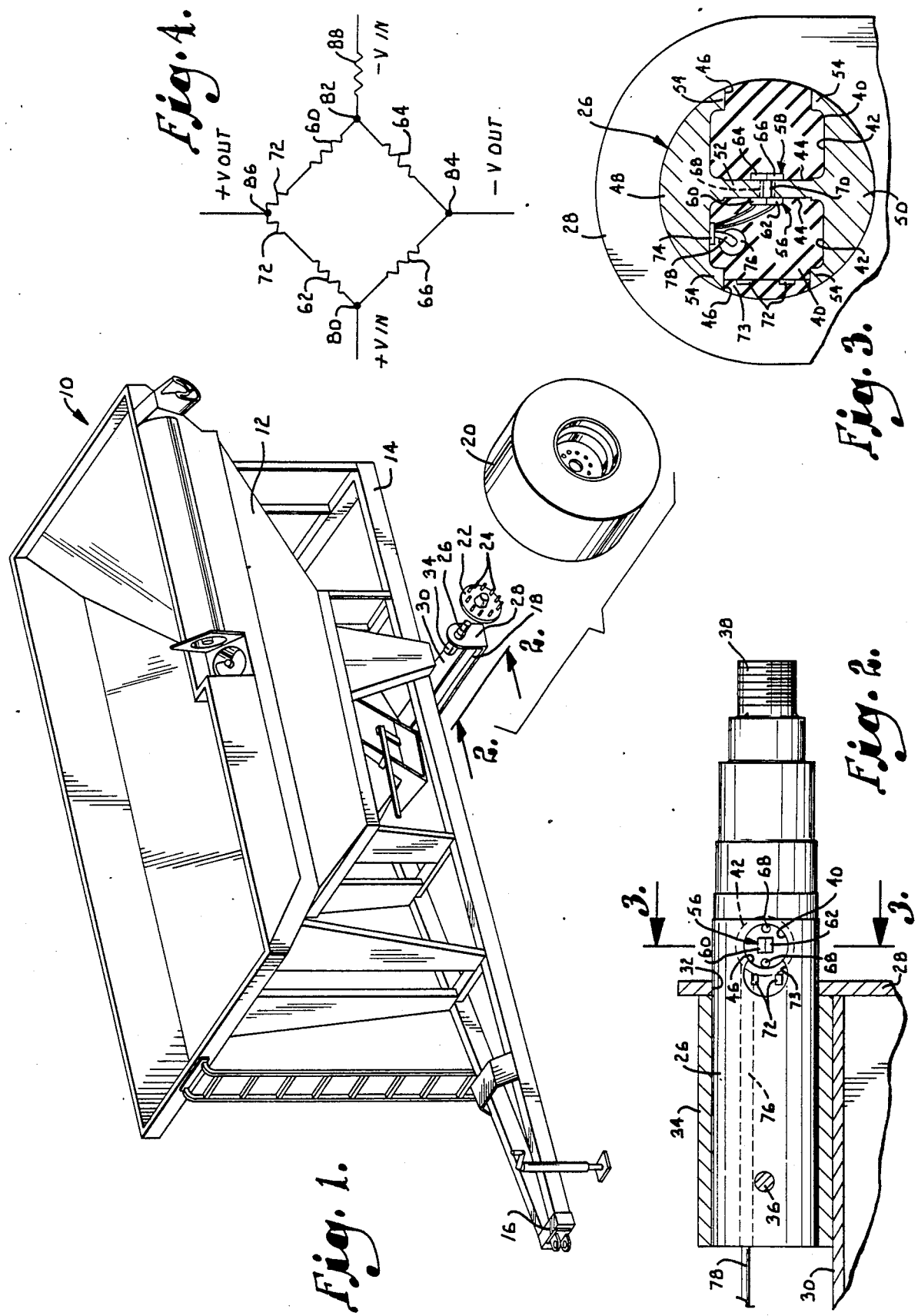

SHEAR BEAM WEIGH AXLE TRANSDUCER

BACKGROUND OF THE INVENTION

This invention relates generally to axle transducers for weighing the contents of cargo carrying vehicles such as grain wagons. The invention deals more particularly with a weigh axle transducer which is constructed to take advantage of shear beam techniques.

As disclosed in U.S. Pat. No. 3,650,340 to Bradley, grain carts and other wheel mounted containers that are used for various agricultural applications are sometimes equipped with an electro-mechanical system for weighing the contents of the container. In the arrangement shown in the Bradley patent, strain gauges are mounted on an axle which functions as a beam that deflects in proportion to the loading of the container. The beam deflection is sensed by the strain gauges and used to generate an electric output signal which is proportional to the deflection and thus to the weight of the container.

Although bending beam transducers of this type function in a generally satisfactory manner in low capacity applications, they are not well suited for use in the weighing of heavy loads. Because the strain gauges must be spaced along the beam length, the beam must have adequate length between the container and wheel to accommodate the gauge spacing that is necessary to obtain a sufficient electrical signal from the gauges. With a large capacity container which is subject to heavy loads, structural considerations dictate that the beam have a sizeable diameter in order to provide a moment of inertia adequate to compensate for the considerable bending moment that results from the heavy loading. However, the large beam diameter reduces the deflection of the beam, and the strain gauges must be spaced farther apart in order to provide an acceptable signal. This in turn requires a longer beam which increases the bending moment and necessitates that the beam diameter be increased in order to compensate for the increased bending moment. Consequently, it is apparent that the structural need for increased beam diameter in large capacity applications works directly against the ability of the beam transducer to generate an adequate signal. Thus, in large capacity applications, the beam at best must be unduly large at least, and this makes it expensive, difficult to manufacture, and undesirable in other aspects. At worst, it is impossible in a heavy capacity machine for the beam to meet the requisite design criteria of generating an acceptable signal and providing adequate structural strength at the same time.

In various industrial application, shear beam transducers have been used on stationary weighing equipment. As disclosed in U.S. Pat. No. 4,459,863 to Nordstrom, I beams are particularly advantageous because the shear strain in the web area of the beam is high and relatively uniform, while the bending related stresses are relatively low in the web. Nevertheless, I-shaped shear beams have not to my knowledge been used in the past in weigh axle transducers or any other mobile scale application. No doubt, one reason is that the I beam configuration is ill suited for the cylindrical beam shape that is characteristic of axles and spindles on which wheels are mounted. The I beam configuration can be formed on a cylindrical spindle by forming a pair of blind openings in its opposite sides. However, if the openings are made large enough in diameter to provide the web of the I beam with sufficient shear strain to generate an acceptable signal level, so much material must be removed from the spindle that its moment of inertia about the web axis is inadequate for the anticipated axle loading. Conversely, if the openings are made small enough to maintain a suitable structural factor of safety, then the shear strain in the web is too low to provide an adequate signal.

SUMMARY OF THE INVENTION

The present invention is directed to a weigh axle transducer which takes advantage of the beneficial aspects of shear beam transducers without detracting from the structural integrity of the beam or spindle which is used to mount a grain cart or other mobile container on its wheels. In accordance with the invention, a cylindrical spindle is provided with an I-shaped sectional configuration by forming aligned blind openings in its opposite sides. Each opening is undercut or stepped to provide it with two portions that differ in diameter, a relatively large diameter cavity at the blind end and a smaller diameter passage at the entry end. The undercut geometry of the openings provides the spindle with adequate shear strain in the web of the I beam due to the relatively large diameter cavities, while the smaller diameter passages assure that the spindle retains adequate strength against laterally imposed loads.

It is an additional feature of the invention that the web of the I beam is provided with a pair of apertures which perform dual functions. The apertures serve as stress risers which increase the signal level of the transducer, and they also provide wiring passages to facilitate electrical connection of the strain gauges that are mounted on the opposite sides of the web. The strain gauges are wired in a bridge circuit which provides amplification of the shear strains and attenuation of bending strains resulting from side loading of the spindle.

The shear beam configuration permits the spindle to remain relatively short and small without sacrificing structural integrity. At the same time, the shorter and smaller spindle has significant cost benefits in material and handling labor. Another important result that is achieved by the I beam configuration is that the strain gauges are recessed within the blind openings that are formed in the spindle, and there is no need to provide external shields or other protective structure for protecting the strain gauges from abuse. The spindle itself adequately shields the strain gauges from physical damage, although it is desirable to provide the usual moisture barrier in order to prevent the strain gauges from being exposed to excessive moisture and other contaminants.

DESCRIPTION OF THE DRAWING

In the accompanying drawing which forms a part of the specification and is to be read in conjunction therewith and in which like reference numerals are used to indicate like parts in the various views:

FIG. 1 is a perspective view of a grain cart which is equipped with a shear beam weigh axle transducer constructed according to a preferred embodiment of the present invention, with the wheel and hub of the grain cart shown in exploded fashion;

FIG. 2 is a fragmentary elevational view on an enlarged scale taken generally along line 2—2 of FIG. 1 in the direction of the arrows, with parts of the axle of the grain cart shown in section;

FIG. 3 is a fragmentary sectional view on an enlarged scale taken generally along line 3—3 of FIG. 2 in the direction of the arrows; and FIG. 4 is a schematic view of a bridge circuit which incorporates the strain gauge resistance elements that are included in the weigh axle transducer.

DETAILED DESCRIPTION OF THE INVENTION

The present invention is directed to a weigh axle transducer which may be used in a wide variety of applications and which is especially well suited for mobile weighing applications and other applications in which lateral strength is desirable in order to resist side loads that are anticipated. By way of example, the weigh axle transducer may be provided on a grain cart of the type designated generally by numeral 10 in FIG. 1. The grain cart 10 includes a hopper shaped container 12 which is connected with a rigid frame 14. The front end of the frame terminates in a tongue 16 which may be hitched to a tractor or other towing vehicle used to tow the grain cart. A rigid horizontal axle 18 is welded or otherwise rigidly secured to the frame 14 and serves to mount the container on a pair of wheels 20 (only one of which is visible in FIG. 1). Each wheel 20 is mounted on a hub 22 by means of conventional lug bolts 24 projecting from the hub. One of the hubs 22 is in turn mounted on a spindle 26 which forms part of the weigh axle transducer of the present invention.

The manner in which spindle 26 is mounted on axle 18 is best shown in FIG. 2. The outer end of axle 18 is provided with a vertical end plate 28, and a horizontal plate 30 extends from the end plate 28 and forms part of the axle 18. Plate 28 is provided with a circular opening 32 which aligns with a cylindrical tube 34 which is welded or otherwise secured on top of plate 30 and to the inside face of plate 28. The main body of spindle 26 is fitted closely inside of the tube 34 and is secured rigidly in place therein by a retaining pin 36 which extends through tube 34 and spindle 26 and which may be secured by cotter pins or the like (not shown).

In this manner, spindle 26 is rigidly secured to axle 18, and it is noted that approximately one-half the length of the spindle extends outwardly beyond the end plate 28 at the outer end of the axle. Spindle 26 is maintained in a horizontal orientation by the mounting arrangement, and its projecting outward end portion is gradually reduced in diameter in a series of steps. The outer end of spindle 26 is threaded at 38, and a non-rotating part of the hub 22 is threaded onto the threaded end 38. The outer or flange part of the hub is supported by bearings (not shown) for rotation relative to the stationary part of the hub which is threaded onto the spindle. Thus, the wheel 20 is able to rotate on the end of the spindle.

As best shown in FIGS. 2 and 3, the main body of spindle 26 is cylindrical, and the opposite sides of the spindle are provided with blind openings 40. The openings 40 extend horizontally and are aligned with one another. Each opening 40 has two portions which differ in diameter from one another. The inner part of each opening 40 takes the form of a cylindrical cavity 42 which is located adjacent to a circular surface 44 formed at the blind or closed end of the opening. Each opening 40 also includes a passage 46 which extends into the side of spindle 26 to the cavity 42. Each passage 46 is cylindrical and is smaller in diameter than the cavity 42. Consequently, each opening 40 has a stepped or undercut configuration in which the cavity 42 provides an undercut portion of the opening larger in diameter than the passage 46.

The openings 40 provide spindle 26 with the cross sectional configuration of an I beam, as best shown in FIG. 3. The I beam includes flanges 48 and 50 at the top and bottom and a flat web 52 which extends between the flanges 48 and 50. The web 52 is vertical and is bounded on its opposite sides by the surfaces 44 formed at the blind inner ends of openings 40. As a result of the stepped or undercut configuration of each opening 40, a collar 54 extends around each passage 46 and projects inwardly from the outer edge of each flange 48 and 50 in order to increase the moment of inertia of the I beam about a vertical axis passing centrally through the web 52.

A dual element strain gauge 56 is mounted on one of the surfaces 44, while a similar dual element strain gauge 58 is mounted on the other surface 44. Each of the dual element strain gauges 56 and 58 includes a pair of strain gauges. For example, gauge 56 includes an upper strain gauge 60 and a lower strain gauge 62 located directly below gauge 60. Similarly, strain gauge 58 includes an upper strain gauge 64 and a lower strain gauge 66 located immediately below gauge 64. Each strain gauge is a conventional device having a plurality of electrically resistive elements which change in their electrical resistance in response to strains imposed on them. The elements in each gauge are oriented at 45° relative to the longitudinal axis of the spindle 26, and the elements in each upper gauge are oriented at 90° to the elements of the corresponding lower gauge. Similarly, the gauges which oppose one another on opposite sides of web 52 have their elements oriented at 90° to one another.

As best shown in FIG. 2, a pair of apertures 68 extend through web 52 at substantially diametrically opposed locations. The apertures 68 are located in a common horizontal plane and are disposed on opposite sides of the strain gauges 56 and 58. Electrical wires 70 are threaded through the apertures 68, as best shown in FIG. 3. The wires 70 are electrical conductors which serve to electrically connect the strain gauges 56 and 58 located on opposite sides of the web 52.

The electrical circuitry also includes a pair of bridge zero resistors 72 which are mounted on the base of a circular recess 73 formed in one side of spindle 26 at a location adjacent to and overlapping with one of the openings 40. Recess 73 is shallower than the adjacent passage 46. The wiring for the strain gauges and resistor 72 lead to terminal strip 74 which is mounted within one of the cavities 42. A longitudinal passage is formed in spindle 26 and extends from cavity 42 to the inner end of the spindle. The end of passage 76 is adjacent to the terminal strip 74, and a cable 78 which extends from the terminal strip is threaded through passage 76. Cable 78 contains the electrical wires for the circuit of the transducer.

FIG. 4 illustrates a Wheatstone bridge circuit which includes the resistance elements of the strain gauges and the resistors 72. The bridge circuit has input terminals 80 and 82, across which an input voltage is applied for driving the bridge circuit. The other pair of opposed terminals 84 and 86 serve as output terminals across which an output voltage appears to provide the output signal of the bridge circuit when it is out of balance. The bridge zero resistors 72 are located adjacent to terminal 86 in two arms of the bridge circuit which also contain the resistance elements of gauges 60 and 62. The other two arms of the bridge circuit include gauges 64 and 66. The bridge zero resistors 72 are trimmed or otherwise adjusted such that the bridge circuit provides a zero output signal in the absence of loading. The bridge circuit also includes a span resistor 88 which is located in one of the input line and which serves to set the range or span of the output voltage signal from the circuit.

In operation, the weigh axle transducer serves to weigh the grain or other materials loaded in container 12. With the container empty, the bridge zero resistors 72 are trimmed until the output voltage across terminals 84 and 86 is zero. The span resistor 88 is also initially trimmed to provide the desired signal range.

When grain or other materials are loaded into container 12, spindle 26 is subjected to shear forces, and the shear strain which is applied to web 52 is directly proportional to the weight of the container contents. Consequently, the bridge circuit is thrown into imbalance, and the output voltage that appears across terminals 84 and 86 is directly proportional to the weight of the container contents. The output voltage signal from the bridge circuit thus provides an accurate measure of the weight of the grain or other material in container 12.

The dual element strain gauges 56 and 58 are connected in the Wheatstone bridge in a manner to amplify the shear strains which are imposed on web 52 while at the same time attenuating bending strains caused by lateral side loads imposed on spindle 26 and the web 52. If spindle 26 is subjected to side loads, the resultant bending of web 52 about a vertical axis causes compression of the elements of the strain gauges located on one side of the web and tension of the elements located on the opposite side of the web. Consequently, the resistance changes of the compressed elements are cancelled by the equal but opposite resistance changes in the elements that are placed under tension. The bridge circuit also cancels the effects of tension or twisting forces applied to the spindle.

The dual diameter geometry of the openings 40 permits an adequate signal level to be generated without weakening spindle 26 below the level of strength necessary to provide an adequate factor of safety. The relatively large diameters of the cavities 42 enhance the shear strain in web 52 and thus enhance the level of the signal provided when the spindle is loaded. At the same time, the relatively small diameter of each passage 46 assures that the I beam exhibits adequate strength against side loading which tends to bend the spindle about a vertical axis passing centrally through web 52. In this respect, it is important that the passages 46 be small enough that the collars 54 have enough inward projection to provide the I beam with the strength necessary to resist the side loads that are encountered in ordinary use of the grain cart.

The apertures 68 perform a dual function. First, the apertures provide wiring passages for the wiring 70 that interconnects the strain gauges 56 and 58 located on opposite sides of the web, and this facilitates electrical wiring of the circuitry. Second, the apertures 68 function as stress risers which increase the level of the signal provided by the bridge circuit.

The shear beam weigh axle transducer of the present invention takes full advantage of the shear beam technique and is characterized by the I beam shape which provides relatively high shear strain and relatively low bending stresses in the web 52. At the same time, the I beam shape is used for the first time in a cylindrical spindle which serves as the deflection beam of the transducer. The I beam shape in a cylindrical spindle is achieved by virtue of the undercut configuration of the blind openings 40 which make it possible to achieve an adequate signal level and the requisite lateral structural strength at the same time.

It should also be noted that the strain gauges 56 and 58 are recessed at the bases of the openings 40 and are thus inherently protected from physical abuse by the spindle itself. Moisture barriers (not shown) may be applied to the entry ends of passages 40 in order to keep out moisture, dust and other foreign elements, thereby protecting the strain gauges and wiring from moisture and contamination.

Although the invention has been described in connection with its application to the grain cart 10, it should be noted that the shear beam transducer is equally applicable to other mobile scale applications and to other applications in which side loading is applied such that the beam requires adequate lateral strength against the anticipated side loads.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. A shear beam transducer comprising:
    a beam presenting opposite sides thereon, said beam being deflectable upon the application of loads thereto;
    a pair of blind openings extending into the respective sides of said beam in alignment with one another, said openings terminating in end surfaces at blind ends of the openings and cooperating to provide the beam with a generally I-shaped cross sectional configuration having upper and lower flanges interconnected by a substantially vertical web presenting said end surfaces on opposite sides thereof;
    each opening being undercut to present a relatively large cavity adjacent the blind end thereof and a smaller passage extending into the side of the beam;
    a pair of strain gauges on each of said end surfaces, each strain gauge exhibiting a resistance which varies in proportion to the shear strain of said web; and
    a bridge circuit having four arms and four corner terminals which define a pair of input terminals for receiving an input voltage and a pair of output terminals for providing an output voltage, said gauges being connected in the arms of the bridge circuit in a manner to provide an output voltage between said output terminals which is proportional to the shear strain of said web.

2. A shear beam transducer as set forth in claim 1, wherein:
    said beam is generally cylindrical in cross section; and said cavity and passage of each opening are generally cylindrical, said cavity having a diameter greater than the diameter of said passage.

3. A shear beam transducer as set forth in claim 2, including:
   at least one aperture through said web, said aperture serving as a stress riser to increase the output signal from the bridge circuit; and
   electrical wiring extending through said aperture to electrically connect the strain gauges on the opposite sides of said web.

4. A shear beam transducer as set forth in claim 1, including:
   at least one aperture through said web, said aperture serving as a stress riser to increase the output signal from the bridge circuit; and
   electrical wiring extending through said aperture to electrically connect the strain gauges on the opposite sides of said web.

5. A shear beam transducer for weighing material loaded in a container, comprising:
   a beam coupled with the container in a manner to deflect in proportion to the load applied to the beam, said beam having opposite sides;
   a pair of blind openings extending into the respective opposite sides of the beam in alignment with one another, said openings cooperating to provide the beam with a generally I-shaped cross sectional configuration having upper and lower flanges interconnected by a substantially vertical web bounded by opposite sides surfaces located at blind ends of the openings;
   each opening having a large diameter cylindrical portion adjacent the blind end thereof and a smaller diameter cylindrical portion extending into the beam to the large diameter cylindrical portion;
   a pair of stain gauges on each of said end surfaces, each strain gauge exhibiting a resistance which varies in proportion to the shear strain of said web; and
   a bridge circuit having four arms and four corner terminals which define a pair of input terminals for receiving an input voltage and a pair of output terminals for providing an output voltage, said gauges being connected in the arms of the bridge circuit in a manner to provide an output voltage between said output terminals which is proportional to the shear strain of said web.

6. A shear beam transducer as set forth in claim 5, wherein:
   the container comprises a cargo carrying container mounted on wheels; and
   said beam comprises a generally cylindrical spindle which mounts the container on one of the wheels.

7. A shear beam transducer as set forth in claim 5, including:
   at least one aperture through said web, said aperture serving as a stress riser to increase the output signal from the bridge circuit; and
   electrical wiring extending through said aperture to electrically connect the strain gauges on the opposite sides of said web.

8. A shear beam transducer as set forth in claim 5, including:
   a pair of apertures extending through said web at substantially diametrically opposed locations thereon disposed in a generally horizontal plane, said apertures serving as stress risers to increase the output signal from the bridge circuit; and
   electrical wiring extending through said apertures to electrically connect the strain gauges on the opposite side surfaces of said web.

9. A weigh axle transducer for weighing the contents of a cargo carrying container mounted on wheels, said transducer comprising:
   a generally cylindrical spindle interconnecting the container and one of the wheels, said spindle deflecting in proportion to the loading of the container;
   a pair of substantially horizontal blind openings in the spindle aligned with one another and terminating at end surfaces at blind ends of the openings, said openings cooperating to provide the spindle with a generally I-shaped cross sectional configuration having upper and lower flanges and a substantially vertical web extending between said flanges and bounded by said end surfaces;
   each opening being undercut to present a cylindrical cavity having a relatively large diameter adjacent the web and a cylindrical passage extending into the spindle to the cavity;
   a pair of strain gauges on each of said end surfaces, each strain gauge exhibiting a resistance which varies in proportion to the shear strain of said web; and
   a bridge circuit having four arms and four corner terminals which define a pair of input terminals for receiving an input voltage and a pair of output terminals for providing an output voltage, said gauges being connected in the arms of the bridge circuit in a manner to provide an output voltage between said output terminals which is proportional to the shear strain of said web.

10. A transducer as set forth in claim 9, including:
    at least one aperture through said web, said aperture serving as a stress riser to increase the output signal from the bridge circuit; and
    electrical wiring extending through said aperture to electrically connect the strain gauges on the opposite sides of said web.

11. A transducer as set forth in claim 9, including:
    a pair of apertures extending through said web at substantially diametrically opposed locations thereof disposed in a generally horizontal plane, said apertures serving as stress risers to increase the output signal from the bridge circuit; and
    electrical wiring extending through said apertures to electrically connect the strain gauges on the opposite side surfaces of said web.

12. A transducer as set forth in claim 9, including:
    a rigid axle for mounting the container on the wheels;
    a rigid tube mounted on said axle, said spindle having one end portion received in and secured to said tube with another end portion of the spindle extending out of the tube; and
    means for mounting said one wheel on said other end portion of the spindle.

* * * * *